United States Patent [19]

Cash et al.

[11] Patent Number: 4,531,955
[45] Date of Patent: Jul. 30, 1985

[54] FLOODED COMPRESSOR SEPARATORS

[75] Inventors: John Cash; John A. Kitchener, both of Richmond, Australia

[73] Assignee: Cash Engineering Co. Pty. Ltd., Richmond, Australia

[21] Appl. No.: 584,399

[22] Filed: Feb. 28, 1984

[30] Foreign Application Priority Data

Apr. 8, 1983 [AU] Australia .................. PF8806

[51] Int. Cl.³ .................. B01D 19/00; B01D 45/06
[52] U.S. Cl. .................. 55/185; 55/216; 55/319; 55/340; 55/438; 55/465
[58] Field of Search ......... 55/169, 185, 190, 216, 55/319, 327, 330, 339, 340, 438, 462, 465, 391, 434, 437, 439

[56] References Cited

U.S. PATENT DOCUMENTS

| | | | |
|---|---|---|---|
| 1,150,342 | 8/1915 | Cogswell | 55/169 X |
| 1,915,987 | 6/1933 | Fisher et al. | 55/330 X |
| 2,226,045 | 12/1940 | Baldwin | 55/391 X |
| 2,642,954 | 6/1953 | Valley | 55/319 |
| 2,937,713 | 5/1960 | Stephenson et al. | 55/391 X |
| 3,192,691 | 7/1965 | Ely | 55/465 X |
| 3,345,807 | 10/1967 | von Felden | 55/462 X |
| 3,507,098 | 4/1970 | Veres et al. | 55/391 X |
| 3,543,325 | 12/1970 | Hamrick | 55/434 X |
| 3,654,748 | 4/1972 | Bloom | 55/322 |
| 3,917,474 | 11/1975 | Heckenkamp et al. | 55/185 X |
| 3,955,945 | 5/1976 | Bauer | 55/185 X |
| 4,092,137 | 5/1978 | Howe et al. | 55/185 X |
| 4,224,043 | 9/1980 | Dupre | 55/439 X |
| 4,260,402 | 4/1981 | Shaffer et al. | 55/462 X |
| 4,405,345 | 9/1983 | van Oorschot | 55/330 X |
| 4,441,871 | 4/1984 | Boller | 55/437 X |

FOREIGN PATENT DOCUMENTS 1165825 10/1967 United Kingdom .

Primary Examiner—Robert Spitzer
Attorney, Agent, or Firm—Bell, Seltzer, Park and Gibson

[57] ABSTRACT

A separator for a flooded liquid/gas compressor comprising a pressure vessel having an inlet for compressed liquid/gas mixture, a lower outlet for liquid and an upper outlet for clean gas, a filter element interposed between the liquid/gas mixture inlet and the clean gas outlet through which the gas flows to said outlet, and a shield member at least partially surrounding the filter element whereby liquid from the separator pressure vessel is prevented from contacting the filter element during periods of operation when the liquid volume in the pressure vessel may rapidly expand.

13 Claims, 5 Drawing Figures

FLOODED COMPRESSOR SEPARATORS

The present invention relates to separators commonly used with flooded compressor systems. The invention also envisages a compressor system including such an oil or other liquid separator.

Flooded compressor systems are most commonly used with rotary compressors including screw and vane type compressors and although the following description provides particular reference to a screw type compressor, it will be apparent to those skilled in the art that the invention is applicable to other compressor systems.

Commonly screw compressors comprise a pair of coacting screw members respectively having male and female helically formed parts which, upon rotation of the screw members, co-operate with the compressor housing to compress gas. To avoid complicated engineering design in relation to rotatably mounting the co-operating screw members there has been developed a system of oil flooding such compressors such that the gas being compressed is mixed intimately with oil as it is compressed and this oil must thereafter be separated from the gas in a separating vessel before the compressed gas is available for its intended use. The separated oil is then recycled through a cooler and an oil filter for re-use in the compressor.

A separator for a compressor system of the aforementioned kind has conventionally comprised a pressure cylinder having its longitudinal axis in a generally vertical direction and having a generally cylindrical final filter element of the coalescent type surrounding the clean compressed gas outlet from the separator vessel. The oil/compressed gas mixture is introduced into the vessel above a sump or pool of oil in the base thereof and there may also be provided some mechanical separator means such as baffles to enable an initial separation of the gas from the oil with the oil dropping into the pool in the base of the vessel. The remainder of the oil is separated in the final filter which either also drops to the oil pool in the base of the separator vessel or is scavenged from the final filter element itself and returned to the compressor.

The previously described system has operated quite satisfactorily, however, there are a number of disadvantages, or problems associated with the system. One major problem is that the coalescent type filters employed in the separator vessel work efficiently only when they have to deal with small quantities of oil in a gas mixture. They in fact become totally ineffective if they are contacted or submerged in bulk liquid oil. Now it necessarily occurs at certain periods of the cycle and when the system is shut down, that the pressure in the separating vessel is reduced. This factor results in the gas entrained in the oil in the sump of the separator expanding rapidly causing the mixture to expand resulting in foaming and a rapid rise in the oil level. It is normal for the oil volume to at least double in size and as a consequence the design of the separator vessel must be such as to permit this without the expanded oil volume contacting the coalescent filter. A second related problem is that the compression process generates substantial heat and the necessary gas contact results in a relatively rapid oxidation of the oil. This factor means that the volume of oil maintained in the system should be kept as great as possible to thereby keep the length of time between oil changes as long as possible. As the separator vessel is a pressure vessel and is therefore expensive to produce both in terms of the materials used and the manufacturing processes required, it is desired from an economic point of view to keep the size of the vessel as small as possible. The separator vessel is a major element in the overall size of the compressor system and this is also a reason for endeavouring to maintain the vessel as small as possible.

Over recent years there has been a further development which essentially proposed the mounting of the compressor unit within the separator vessel to minimize overall size and to also minimize some of the piping connections between the elements in the system. This proposal necessitated the mounting of the separating vessel with its longitudinal axis substantially horizontal. The result naturally substantially aggravated the problem of oil contact with the final coalescent filter element which has conventionally been dealt with by a number of different approaches either separately or in combination. One approach is to try to lower the total oil volume within the system, however, this has the substantial disadvantage of requiring far more frequent down times for replacement of the oil. A second approach is to increase the size or volume of the separating vessel usually by increasing its length. Often in such arrangements the filter element is mounted with its longitudinal axis generally horizontal such that the gas discharge line passes through the end of the separating vessel. This is unsatisfactory as the lower regions of the filter element tend to become saturated with oil thereby substantially reducing its effectiveness and moreover the size of the separating vessel is a substantial disadvantage. A third alternative is to mount the filter element in an upwardly extending T branch from the main separating pressure vessel wall. This latter solution substantially increases the costs of producing the pressure separating vessel.

The principal objective of the present invention is to provide an improved separator for use with a flooded compressor system which will enable a reduction in size of the separator without a reduction in the liquid volume capacity thereof or will enable the use of an increased volume of liquid in the flooded compressor system.

Accordingly the present invention provides a liquid/gas separator for use with a flooded compressor system, said separator comprising a pressure vessel adapted to maintain a pool of liquid in a lower region thereof arranged to receive a mixture of liquid and compressed gas therein, said vessel further having a final filter element interposed between the pool of liquid and a clean compressed gas outlet from the vessel such that liquid is removed thereby from the mixture of liquid and compressed gas flowing through said filter element to the gas outlet, said separator being characterized in that shield means is provided at least partially surrounding said filter element enabling the compressed gas with liquid entrained therewith to reach said filter element with said compressed gas passing through said filter element to the compressed gas outlet, but substantially preventing liquid from said pool from flowing into contact with the filter element. Usually the liquid separated will be an oil or a synthetic liquid lubricant and the use of the terminology "oil" hereinafter should be interpreted as including such synthetic liquid lubricants. Conveniently the shield means comprises a container element having a base positioned beneath the filter element and an upstanding wall or walls sealed with or integral with the base and substantially surrounding the filter element whereby the filter element is maintained within a dry sump formed by the container element. Alternatively partitioning might be employed. Preferably one or more gas flow spaces are provided adjacent to the upper regions of the filter element whereby gas together with small gas borne droplets of oil pass into engagement with the filter element to finally remove substantially all oil therefrom.

In accordance with a particularly preferred embodiment a shroud element is provided between the wall or walls of the container element whereby the gas and gas borne oil droplets are caused to first flow downwardly between the wall or walls of the container element and the shroud element and then upwardly and through the filter element. Such a shroud will have the added effect of further mechanical oil separation as well as preventing oil splashing on to the filter element should the oil level (in particularly adverse conditions) rise sufficiently to enter the container element.

Preferably, in both the aforementioned embodiments, an oil scavenger line is provided for removing oil collected in the base region of the container element thereby preventing this oil volume rising sufficiently to contact the filter element.

This invention will be better understood from the following description of preferred embodiments given in relation to the accompanying schematic drawings. In the drawings.

Figure 1:
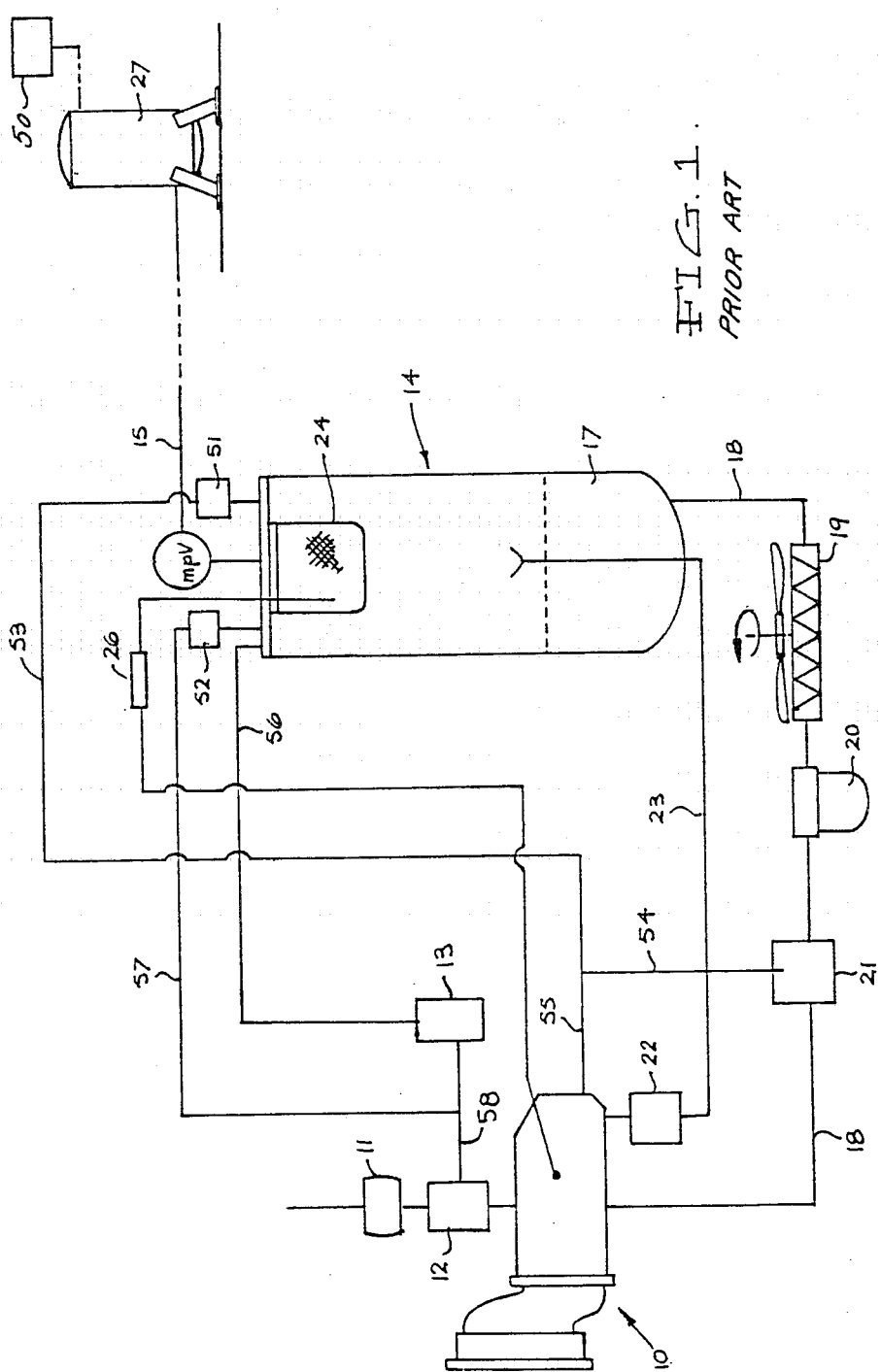
FIG. 1 is a schematic flow diagram of a conventional screw compressor system showing a known embodiment of a separator.

Referring initially to FIG. 1 there is shown a schematic flow diagram for a conventional screw compressor system. In this system gas to be compressed is drawn into a screw compressor 10 through an gas filter 11 and an inlet flow control or throttle valve 12. The flow control valve 12 is controlled by a solenoid element 13 which senses that discharge pressure from the separator 14 has reached a predetermined level. The gas discharge line 15 from the separator includes a minimum pressure valve 16 which ensures that a minimum pressure is maintained in the separator whereby oil will always flow therefrom to the compressor 10 because of the pressure differential therebetween. The oil is maintained in a sump or pool 17 in the base of the separator 14 and is returned therefrom to the compressor 10 via line 18, cooler 19, and an oil filter 20 and oil stop valve 21. During operation of the compressor the stop valve 21 is maintained open to allow oil to flow to the compressor, however, during periods when the compressor 10 is not functioning, oil is prevented from flooding the compressor, which would provide an unacceptably high start up loading, by closing the valve 21. Furthermore, the compressed gas/oil mixture exiting from the compressor 10 flows through a one way valve 22 along line 23 to be discharged into the separator 14 at a position usually above the sump or pool 17. The separator may include some mechanical separation means whereby oil will fall back into the pool and gas and gas borne oil droplets will flow relatively slowly upwardly to finally remove the gas borne oil droplets in a final filter element 24 of the coalescent type. Finally an oil scavenging line 25 is provided with an gas flow restriction 26 to enable liquid oil collected in the filter element 24 to be returned (again by way of the pressure differential) to the compressor 10.

Now in operation, if the rate of use of the compressed gas is less than the delivery rate of the compressor, the system pressure will rise and at a preset maximum a pressure switch 50 will sense this use and operate the solenoid element 13 to close the gas inlet valve 12. With the inlet gas supply substantially removed, the system pressure will fall until the pressure switch, on reaching a lower pre-set level will again operate the solenoid and re-open the valve 12. Now when the inlet valve 12 has been closed, the compressor is inducing gas at a very low inlet pressure due to the closed inlet valve, but the pressure in the separator is still relatively high, thereby causing the compressor to compress gas across a very high compression ratio compared to normal operating conditions. This would give rise to high unloaded power consumption and excessively high noise levels. To avoid this problem in the conventional arrangement the minimum pressure valve is provided with an integral non return valve and a pressure lowering valve 52 is also provided. This reduces the back pressure against which the compressor operates, however it also gives rise to periodic lowering of separator pressure. Moreover, a stop dump valve 51 is provided to dump pressure from the separator on shut down of the compressor system. Both these situations cause the compressed gas mixed in with the oil in the sump 17 to expand rapidly causing the oil to foam and the oil level to rise rapidly. To prevent liquid oil from contacting the filter element 24 under such conditions, it has conventionally been proposed to either increase the size of the pressure tank of the separator 14 or alternatively to reduce the volume of the oil in the system. Both solutions have substantial disadvantages as previously indicated.

Figure 2:
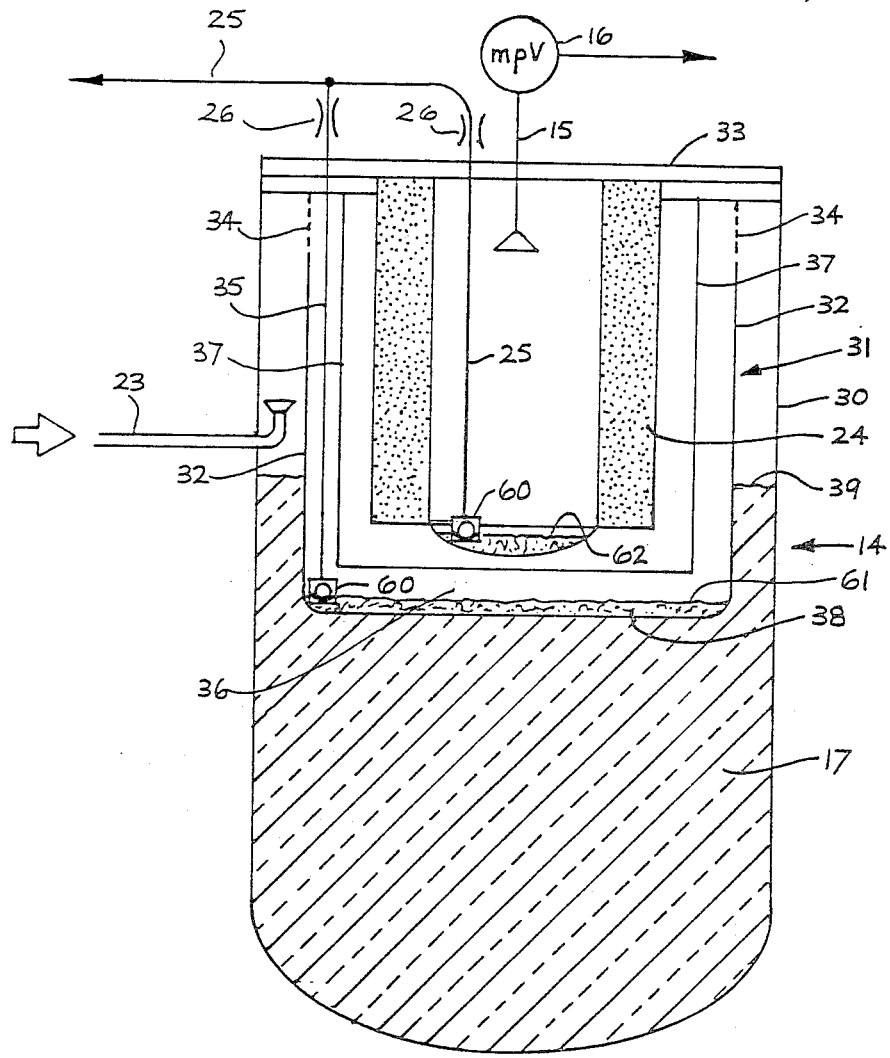
FIG. 2 is a schematic sectioned elevation view of a first preferred embodiment according to the present invention.
Figure 2A:
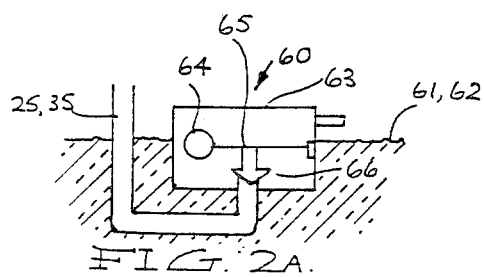
FIGS. 2A and 2B are schematic drawings demonstrating the operation of float controlled valves in liquid purge lines employed in the separator.
Figure 2B:
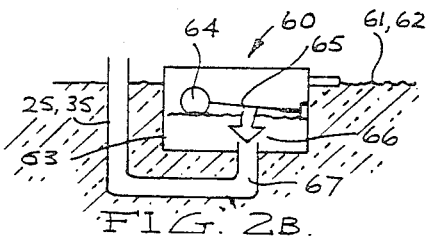
Figure 3:
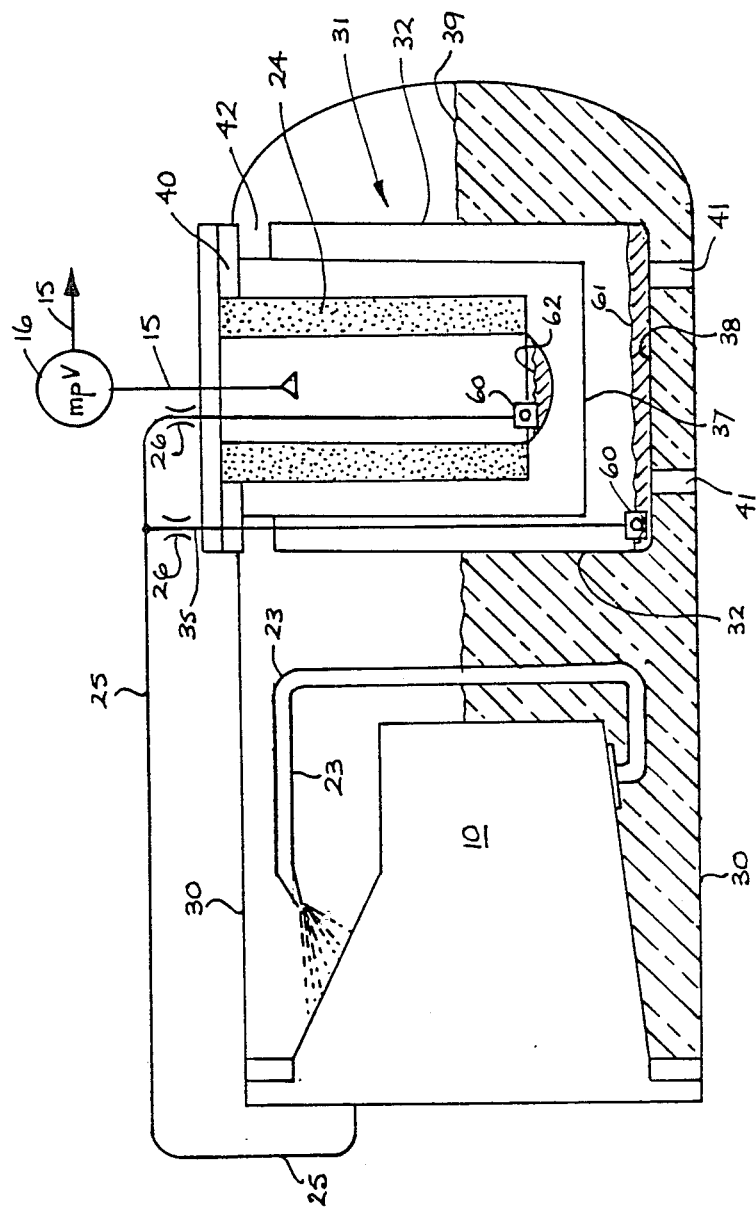
FIG. 3 is a schematic sectional elevation view of a second preferred embodiment according to the present invention.

FIGS. 2 and 3 show preferred embodiments according to the present invention which provide advantageous solutions to the foregoing problem. FIG. 2 shows a separator 14 adapted for use in a substantially conventional screw compression system as shown in FIG. 1. The separator comprises a pressure tank 30 having a compressed gas and oil inlet line 23 and a compressed gas discharge line 15 which may include a minimum pressure valve 16. A substantially conventional final filter element 24 (which may be of the coalescent type) is provided surrounding the gas discharge outlet line 15 so that gas/oil mixtures must pass therethrough to separate oil from the gas. Mounted generally surrounding the final filter element 24 is a container member 31 having a base 38 and side walls 32 mounted from an end wall 33 of the pressure vessel 30. The container member 31 includes a plurality of openings or spaces 34 at its upper regions adjacent the end wall 33 to enable gas borne oil droplets to pass inwardly into the container and thereby to the filter element 24. An oil scavenging line 25 extends from the internal regions of the filter element 24 and returns the oil collected to the screw compressor. In addition a second oil scavenging line 35 extends from the internal base region of the container member 31 to the line 25 and also returns oil collected to the screw compressor. Each of the lines 25 and 35 include a restrictor 26 to minimize gas loss from the separator. Moreover, each of the purge lines 25, 35 may include a float controlled valve 60 (see FIGS. 2A,2B) which are arranged to positively prevent gas flow through the lines 25 or 35 such that gas losses are avoided. The float valve 60 may be located either within or externally of the separator unit. Each valve 60 comprises a chamber 63 with an access opening adapted to receive oil 61,62 from either the base of the container member 31 or the base of the final filter element 24. An outlet opening 67 is provided leading to either purge line 25 or 35 and is opened (FIG. 2B) or closed (FIG. 2A) by a valve element 60 operated by a float member 64 and lever 65. It will be appreciated that other forms of valving might be used to ensure against gas losses along the respective purge lines. In this manner a substantially dry sump 36 is formed in which the filter element 24 is located. A further preferred feature is the provision of shroud 37, also mounted from the end wall 34 and surrounding the filter element 24 between this element and the walls 32 of the container member 31. The shroud 37 performs a dual function in forcing gas and gas borne oil droplets to flow downwardly to the base of the filter element 24 before flowing upwardly therethrough to the discharge line 15. This provides additional mechanical oil separation and a better distribution of gas flow through the filter element 24 as well as protecting the filter element from possible oil splashing should the oil pool level 39 happen to rise to the level of the openings 34.

FIG. 3 illustrates a somewhat similar arrangement to FIG. 2 and consequently only the differences will be described hereinafter. In this embodiment, the screw compressor 10 is mounted within the separator pressure vessel 30 and as a consequence, the vessel 30 is arranged with its axis substantially horizontal. This arrangement provides some savings in overall size of the system as well as minimizing some of the piping requirements. The final filter element 24 is mounted through an opening in a side wall of the pressure vessel 30 and closed by a cap plate 40. Furthermore in this embodiment the container member 31 may be formed as a separate unit and connected to or sitting on base support elements 41 such that an upper restricted gap 42 is formed between the top of the side walls 32 of the container member and the closure plate 40. In addition the oil gas mixture line 23 exiting from the compressor 10 may include nozzle means to direct a spray against a desired area of the system to assist in an initial mechanical separation of oil from the compressed gas. The operation of the system shown in FIG. 3 is essentially similar to that of FIG. 2 and it will be appreciated by those skilled in this art that modifications or various combinations of features disclosed herein would be possible within the scope of the present invention.

It has been found that with the present invention, it is possible to reduce the size of the pressure vessel 30 for a given performance size of the compressor and/or to increase the volume of oil used in the system.

We claim:

1. A liquid/gas separator for use with a flooded compressor system, said separator comprising a pressure vessel having a first lower region and a second region therewithin and an upwardly facing wall for maintaining a pool of liquid in the first lower region and for receiving a mixture of liquid and compressed gas in the second region above the pool of said liquid, a clean compressed gas outlet arranged in said upwardly facing wall of said vessel, a tubular filter element positioned for receiving the mixture of liquid and compressed gas and having a substantially vertical axis surrounding said gas outlet such that liquid is removed by said filter element from the mixture of liquid and compressed gas flowing therethrough from the second region of said vessel to said gas outlet, a container means having a base adjacent to but spaced below a lower extremity of said filter element and upstanding wall means whereby said base and said upstanding wall means define a dry sump region impervious to the liquid surrounding at least lower regions of said filter element, said liquid impervious upstanding wall means extending to a position adjacent to but spaced below said upwardly facing wall of the pressure vessel thereby defining at least one opening adjacent said upwardly facing wall of said pressure vessel for the mixture of liquid and compressed gas to flow to said filter element, and a liquid impervious shield member surrounding said filter element and overlaying said opening or openings arranged such that said shield member extends downwardly between said upstanding wall means and said filter element to a position at least intermediate the lower extremity of said filter element and said opening or openings above said impervious upstanding wall means thereby preventing liquid from the first region of said pressure vessel flowing into direct contact with said filter element.

2. A separator according to claim 1 wherein a liquid purge line is provided leading from said dry sump region at a location below the lower extremity of the filter element.

3. A separator according to claim 2 wherein said purge line includes a float controlled valve permitting the flow of substantially liquid only along said purge line.

4. A separator according to claim 3 wherein said purge line also includes a restrictor to minimize gas loss from the separator.

5. A separator according to claim 1 wherein the pressure vessel has an axis substantially parallel to the axis of said filter element.

6. A separator according to claim 1 wherein the pressure vessel has an axis substantially perpendicular to the axis of said filter element.

7. A flooded compressor system including a separator according to claim 6 and further including a compressor mounted substantially within the pressure vessel of said separator.

8. A flooded compressor system according to claim 7 wherein said compressor includes means for discharging the mixture of liquid and compressed gas directly into the second region of said pressure vessel.

9. A liquid/gas separator for use with a flooded compressor system, said separator comprising a pressure vessel having a first lower region and a second region therewithin and an upwardly facing wall for maintaining a pool of liquid in the first lower region and for receiving a mixture of liquid and compressed gas in the second region above the pool of said liquid, a clean compressed gas outlet arranged in said upwardly facing wall of said vessel, a tubular filter element positioned for receiving the mixture of liquid and compressed gas and having a substantially vertical axis surrounding said gas outlet such that liquid is removed by said filter element from the mixture of liquid and compressed gas flowing therethrough from the second region of said vessel to the gas outlet, wall means impervious to said liquid defining a dry sump region surrounding at least lower regions of said filter element, said liquid impervious wall means extending to a position adjacent to but spaced below said upwardly facing wall of the pressure vessel thereby defining at least one opening adjacent said upwardly facing wall of the pressure vessel for the mixture of liquid and compressed gas to flow to said filter element, a liquid impervious shield member surrounding said filter element and overlaying said at least one opening arranged such that said shield member extends downwardly between the wall means and the filter element to a position at least intermediate the lower extremity of said filter element and said at least one opening above said impervious wall means, and a liquid purge line leading from said dry sump region at a location below the lower extremity of said filter element, whereby liquid from the first region of said pressure vessel is prevented from flowing into direct contact with said filter element.

10. A separator according to claim 9 wherein the pressure vessel has an axis substantially perpendicular to the axis of said filter element.

11. A flooded compressor system including a separator according to claim 10 and further including a compressor mounted substantially within the pressure vessel of said separator, said compressor including means for discharging the mixture of liquid and compressed gas directly into the second region of said pressure vessel.

12. A liquid/gas separator for use with a flooded compressor system, said separator comprising a pressure vessel having a first lower region and a second region therewithin and an upwardly facing wall for maintaining a pool of liquid in the first lower region and for receiving a mixture of the liquid and compressed gas in the second region above the pool of said liquid, a clean compressed gas outlet arranged in said upwardly facing wall of said vessel, a filter element interposed between said second region of the pressure vessel and said gas outlet for receiving the mixture of liquid and compressed gas and such that liquid is removed by said filter element from the mixture of liquid and compressed gas flowing therethrough to the gas outlet, wall means impervious to the liquid defining a dry sump region surrounding at least lower regions of said filter element, said liquid impervious wall means extending to a position adjacent to but spaced below said upwardly facing wall of said pressure vessel thereby defining at least one opening adjacent said upwardly facing wall of the pressure vessel for the mixture of liquid and compressed gas to flow to said filter element, and a liquid impervious shield member interposed between said wall means and said filter element and arranged to overlie said at least one opening, said shield member extending downwardly between said wall means and said filter element to a position at least intermediate the lower extremity of said filter element and said at least one opening above said impervious upstanding wall means thereby preventing liquid from the first region of said pressure vessel flowing into direct contact with said filter element.

13. A flooded compressor system including a separator according to claim 12 and further including a compressor mounted substantially within the pressure vessel of said separator, said compressor including means for discharging the mixture of liquid and compressed gas directly into said second region of said pressure vessel.

* * * * *